United States Patent [19]

Oshida et al.

[11] 3,779,860

[45] Dec. 18, 1973

[54] THERMAL AND ACOUSTICAL STRUCTURAL INSULATING COMPOSITION

[75] Inventors: Otto A. Oshida, Fountain Valley; Michael Shawgo, Buena Park, both of Calif.

[73] Assignee: Grefco, Inc., Philadelphia, Pa.

[22] Filed: Mar. 9, 1972

[21] Appl. No.: 233,285

[52] U.S. Cl............ 162/129, 162/123, 162/125, 162/145, 162/181 R, 161/152
[51] Int. Cl. ............................................. D21f 11/00
[58] Field of Search................. 162/129, 145, 123, 162/125, 181 R, 181 C, 184, 300; 161/152, 158, 236, 237, 403

[56] References Cited
UNITED STATES PATENTS

| | | | |
|---|---|---|---|
| 2,634,207 | 4/1953 | Miscall et al.................... | 162/181 R |
| 2,475,781 | 7/1949 | Gallup ............................... | 161/236 |
| 2,108,761 | 2/1938 | Becker............................. | 162/181 R |
| 3,373,074 | 3/1968 | D'Eustachio et al. ............... | 161/236 |
| 1,921,369 | 8/1933 | Massey .............................. | 162/184 |

FOREIGN PATENTS OR APPLICATIONS

| | | | |
|---|---|---|---|
| 805,636 | 2/1969 | Canada............................. | 161/152 |

Primary Examiner—S. Leon Bashore
Assistant Examiner—Peter Chin
Attorney—Everett H. Murray, Jr. et al.

[57] ABSTRACT

A coated thermally expanded mineral aggregate thermal and acoustical insulating structural composition and a process for its production is provided wherein a low consistency board furnish containing binder, defibrillated fibrous material and a relatively high percentage of glass reinforcing fibers is deposited on the surface of a partially dewatered mat containing defibrillated fibrous material, binder and 50–85 percent thermally expanded mineral aggregate by weight of the total board composition, pressing and drying to produce an integrally formed multiply structural composition.

14 Claims, No Drawings

THERMAL AND ACOUSTICAL STRUCTURAL INSULATING COMPOSITION

The invention relates generally to thermal and acoustical insulating compositions, especially those compositions useful as structural insulation and acoustical tile.

Insulating products have been known for many years, especially those incorporating various inert types of mineral aggregates, fibrous materials and assorted binders. An example of inert types of mineral aggregate includes exfoliated vermiculite and expanded perlite. Perlite is a form of glassy rock similar to obsidian, usually containing, 65 to 75 percent silicon dioxide, 10 to 20 percent aluminum trioxide, and 2 to 5 percent water. When perlite is heated to the softening point, it expands to form a light, fluffy material similar to pumice. Vermiculite is a mineral of the mica group; however, it is hydrated and has the property of expanding six to twenty times its volume when heated to about 2,000°F. Basically, it is a hydrated magnesium-aluminum-iron silicate which contains small quantities of other minerals. Perlite is a generic term for the above noted glasses of the volcanic type, which upon being heated to controlled temperatures expand to form lightweight particles possessing good thermal and sound insulating qualities. Further, it has been known that both the expanded perlite and the exfoliated or expanded vermiculite possess special qualities when used in conjunction with fibrous material and select binders for manufacturing lightweight insulating boards of various types. Certain of these products have been found to be extremely useful as roofboard insulators as well as acoustical tiles and have included a large proportion of either the vermiculite or the perlite mineral aggregate, a relatively low proportion of fibrous material, i.e., an amount proportional to the strength contributing properties of this ingredient, and sufficient binder to hold the aggregate and the fibers firmly together in a dimensionally stable structural board composition.

Such products have generally been formed using the "wet process" which involves preparation of a water slurry of the board ingredients, defibrillation of the fibrous material, uniform suspension of the solids throughout the slurry through agitation, de-watering the slurry by passing it over, e.g., a drainage screen or the like to produce a felted wet board, light compression of the wet board to consolidate and impart uniform thickness thereto, followed by drying of the formed board. The instant invention modifies the above described process notably by partially de-watering the felted board prior to application of a thin coating to the still-wet board after it has been consolidated somewhat to insure uniform thickness. Ultimately the board is de-watered, pressed to uniform thickness and dried as in the above process. The board forming slurries containing the mineral aggregates discussed above have very favorable de-watering properties which render the slurries advantageously free-filtering in nature.

The end result is a multi-component insulating board containing a mineral aggregate, fibers and a binder wherein an inter-entangled mass of loose fibriliated fibers entrap and hold the particles of the mineral aggregate in a spaced relationship throughout the structural insulation board.

Some of the recognized shortcomings of thermal and acoustical structural insulation board, especially of the perlite type insulation board, have been poor strength properties in the top surface of the board, easily abradable top and bottom board surface and high absorption or penetration of hot-mopped asphalt into the board, thereby requiring greater amounts of asphalt for bonding. These shortcomings have at time resulted in (inadequate) bond strength between the roofing membrane and the top surface of the insulation board or between the bottom surface of the insulation board and the roof back.

These shortcomings have been alleviated somewhat through the development of an asphalt-clay coating for application to the top surface of the insulation board resulting in minor improvement in board strength properties. However, recently a more economical two-ply roofing system has been introduced creating a new problem of roofing membrane splitting due to thermal expansion and contraction resulting from large variations in outside temperature. With some glass fiber boards these splits have been reported to occur at the abutted joints of the boards but the problem has been mollified by taping the joints. Similar splits in roofing membranes have been reported in the Permalite-type boards but assume no distinct pattern with the splits causing the board itself to break thereby resulting in a fissure extending through the top surface of the board to the lower surface abutting the roof back. This unpredictable random splitting of the membrane has again been attributed to insufficient board strength properties, especially at the top surface of the Permalite-type thermal and acoustical insulation boards.

The two-ply roofing system is used frequently despite the above noted deficiencies. The general purpose of this invention is to provide major strength improvements in the Perlite-type thermal and acoustical insulation board which will overcome the above-noted deficiencies. Fundamentally, this is accomplished by applying a relatively thin coating of a defibrillated cellulosic fibrous material as a reinforcing fiber and a binder also containing other additives over the top surface of a mat deposited on a board forming machine which would also comprise basically a defibrillated cellulosic fibrous material and a binder, whereby the coating is applied at the "wet end" of the board forming process and forms a coating or skin as an integral part of the board, thereby eliminating a laminating process.

OBJECT OF THE INVENTION

It is a primary object of the present invention to improve upon the prior art structural insulating compositions by providing a composition which has all of their advantages, including light weight, ease of formation in the wet process and additionally possessing substantially improved insulating qualities as well as substantially improved board strength, by applying a coating to at least one major surface of the "wet mat" during the board forming process.

It is an additional object of this invention to provide a coating for such structural board, which coating contains mineral fibers, e.g., glass, rock, slag and asbestos fibers thereby eliminating warping caused by excessive shrinkage during the drying process and materially increasing the surface strength of the resultant insulation board.

It is the further object of this invention to provide a process for applying a coating or skin to the surface of the wet mat board during the board-forming process, which coating becomes an integral part of the board thereby eliminating a laminating step.

It is an additional object to provide a process for forming structural insulation boards which are coated as well as those which are multiple-ply having dissimilar board compositions in different strata.

A further object of this invention is to provide a general purpose insulating board having especially good heat and sound insulating qualities, while combining optimally low weight per unit volume with adequately high flexural strength.

SUMMARY OF THE INVENTION

A thermal and acoustical insulating composition and a process for its production are provided wherein the composition comprises, inter alia, a mineral aggregate, a defibrillated organic fibrous material and a binder wherein the insulating composition is in the form of structural insulating board and a coating containing mineral fibers is applied to at least one major surface of the structural insulating composition.

Additionally, a process for producing the coated thermal and acoustical insulating structural material is provided which involves adequately mixing a thermally expandable mineral aggregate, a defibrillated organic fibrous material and a binder, depositing a sufficient amount of said composition on a board forming machine to form a mat of desired thickness and consistency, partially de-watering the mat, applying to the still-wet surface of the mat a coating containing organic fibers and a binder followed by de-watering, pressing and drying the mat to produce the coated thermal and acoustical insulating structural material.

More specifically, the invention comprises a thermal and acoustical insulating composition which is produced from a thermally expandable mineral aggregate such as perlite or exfoliated vermiculite, a defibrillated cellulosic fibrous material, such as cellulosic pulp, and a binder which is generally bituminous in nature, in a slurry which is deposited on a board-forming machine in the wet state and partially de-watered. Subsequent to the partial de-watering, a coating is applied to the still-wet deposited mass wherein the coating contains a defibrillated organic fibrous material such as pulp, a binder which is generally bituminous in nature, clay, starch, and glass fibers in addition to other additives which may improve fire retardant properties of the resultant board. These additives may include among others, boric acid, borax, ammonium sulfate, and various phosphates which all contribute generally to improve the fire retardance. The limitation to be considered with particular regard to fire retardant promoters is the adverse effect that these water soluble additives have on the water absorption property of the resultant board. The coating is of a low consistency, that is, a low solids coating possessing a high percentage of glass fibers for reinforcement and ultimately provides an insulation material with a tough coating on its surface which imparts greatly improved strength properties to the board. Not only have the specific ingredients of our insulating composition been selected and combined with care, so too have the proportions of ingredients been chosen to give optimum results.

Our invention also comprises use of the following ranges (Table I) of proportions by total weight of final dry insulating composition and by total weight of final dry coating composition used thereon:

TABLE I

| Ingredients | Percent of Board Substrate | Percent of Ingredients in Coating |
| --- | --- | --- |
| Thermally expandable mineral aggregate | 50–85 | NONE |
| Defibrillated organic fibrous material | 10–30 | 40–80 |
| Bituminous Binder | 1–12 | 5–20 |
| Clay | 0.1–8 | 2.0–15 |
| Starch | none | 1.0–10 |
| Glass fibers | none | 0.1–10 |

Various other additives may be included in the above-noted composition to improve qualities commensurate with the qualities and the degree to which they are improved.

Some additives may improve particular aspects such as thermal and acoustical insulating efficiency, transverse strength characteristics, surface strength characteristics, etc. without appreciably detracting from other important characteristics necessary for an advantageously utilizable structural material.

The thermally expanded mineral aggregate, e.g., perlite or exfoliated vermiculite used in these compositions should comprise from 50 to 85 percent by weight of the total board composition. The expanded mineral particles facilitate de-watering of the wet board slurry and, being hollow in nature, contribute voids to the interior of the final board thereby resisting transfer of heat by convection and conduction. It also contributes to the compressive and tensile strength of the board as well as to its indentation resistance.

The expanded mineral aggregate used in conjunction with this invention should be in particle form having an apparent bulk density of about 2 through 8 pounds per cubic foot, although departures from these ranges may be made in appropriate circumstances. Mesh sizes of the expanded mineral aggregate should range from about 20 to about 200 mesh for optimum performance, however, other sizes may also be utilized as well.

The fibers used herein are usually obtained from wood; however, cellulosic fibers are used depending upon the supply. For example, corn stalks, sugar cane, waste paper fibers repulped broke or the like may be utilized. In addition, non-cellulosic fibers my be utilized either exclusively or in combination with cellulosic fibers. For purposes of simplicity the description will be confined to cellulosic fibers and it will be understood that other fibers may be used while remaining within the scope of this invention.

Fibrous substances used within the purview of the instant invention are all used in their defibrillated or individualized state. They include various organic fibers such as newprint pulp, bagasse and others. Of course these fibers are not limited to organic or cellulosic fibers. Other fibrous material may be used dispersed in the slurry which are not organic, such as asbestos, rock, slag and glass fibers. They too may improve strength characteristics of the board in addition to fire retardancy characteristics. The fibrous material is dispersed in the board-making slurry such that the individual fibers are separated from one another, thus assuring their presence in the final board composition and coating as a mass of inter-entangled fibers which surround the aggregate particles as well as the other components of the board slurry. Long or short fibers may be used equally well or a mixture of fibers of different lengths may be employed successfully. However, for optimum results the fibers in the board should be from 1 to 5 millimeters long and 5 to 30 microns in diameter, while those fibers utilized in the coating should be from 3 to 30 millimeters long and from 5 to 30 microns in diameter.

Various examples of materials which can be utilized principally as binders, however which may contribute other favorable characteristics to the substrate composition useful in practicing the instant invention used either alone or in combination, are clays such as kaolin or china clay, ball clay, fire clay, stoneware clay, bentonite, fuller's earth, activated clays, dusting clays, bleaching clays, calcined clays, colloidal clays, enamel clays and filler clays; starch may be used and various bituminous additives such as asphalt may be added either as a solid or in the form of an emulsion. Other materials having similar properties in accomplishing similar effects may be utilized in the practice of the instant invention. Particularly advantageous in the practice of this invention is asphalt as the binder, along with bentonite clay and starch.

The amount of binder used in the insulation board is indicated as at from 1 to 12 percent and in the coating from 5 to 20 percent which are dry weights of the final composition. Bentonite clay is, of course, incombustible and its use enhances the fire resistance of the board. It also functions as a water repellant inasmuch as it swells in the presence of water and thereby tends to fill surrounding board void, so that further take-up of water by the board becomes more difficult. If starch is employed as a binder it is possible to use minimum quantities of fibrous material to thereby lighten the board and improve its fire resistance. Asphalt is inexpensive, easy to use and functions sufficiently well as a binding material, in addition to its added quality of improving water repellancy of the final insulating board. It is certainly within the perview of this invention to use various combinations of these materials to give an advantageously improved product. An example of this is the combination of bentonite clay and starch which improves the fire resistance of the board while assuring high binding strength. Similarly, the use of bentonite clay in conjunction with asphalt improves the fire resistance and moisture resistance of the board.

The primary advantage of the instant invention is the notable strength improvements in the thermal and acoustical insulating composition board discussed above, which strength increase is obtained by applying a thin coating of a fibrous furnish, i.e. coating, to the surface of the wet mat laid down from the slurry on the board forming machine during the board forming process and prior to the de-watering, pressing and drying operations. The process, as noted above, involves adequately mixing the thermally expanded mineral aggregate, a defibrillated, preferably cellulosic fibrous material, a binder and clay in an aqueous slurry; depositing a sufficient amount of said composition on a board forming machine to form a mat of the desired thickness and consistency, partially de-watering said mat, and applying to the still-wet surface of the mat a coating comprising basically, pulped newsprint and asphalt emulsion with additives of glass fibers, starch, clay etc.

The wet mat is then passed under a head box which lays the fibrous coating of the present invention onto the wet surface of the mat. The coating may be roller-coated, or it may be applied through a plurality of sprays fed from a pressurized supply source or it may be applied in a brushing operation. The mat had sufficient body after partial dewatering to receive the coating without marring its surface or displacing the fibers. When a roller coater is used, a source supply continuously feeds the coating to the coating machine to insure application of a proper thickness of coating to the board substrate. The wet board is then further dewatered, pressed and dried to form the structural insulation board. Several embodiments of the invention have been described in some detail below in order to enable those skilled in the field to apprehend fully the principles and to produce such units using only the ordinary skills of their specialty. No inference, however, should be drawn from the detailed character of the description that the invention is limited in its employment to any such details of composition or procedure. On the contrary, a wide variety of embodiments is possible, as will readily occur to those skilled in this field and the intention is to cover all alternatives, substitutions and equivalents only within the spirit and scope of the invention as expressed in the appended claims. The invention is further illustrated by the following examples in which all parts and percentages are by weight unless otherwise indicated. These non-limiting examples are illustrative of certain embodiments designed to teach those skilled in the art how to practice the invention and to represent the best mode contemplated for carrying out the invention.

EXAMPLE I

The following example illustrates the preparation of the coated thermal and acoustical insulating structural composition discussed in the foregoing.

Pulped newsprint in such a proportion as to constitute 22 ½ percent by weight of the final dry board is added to water to make a diluted paper pulp slurry. An appropriate amount of binder, in this instance 5 percent by weight of an asphalt binder, is added to the aqueous pulp slurry. Twenty percent of the pulped newsprint-asphalt requirement is then removed for subsequent use as the coating for the board being prepared. Glass fibers are then added to the coating composition in a sufficient amount to constitute 2.5 percent of the coating composition in the final product. The fibers ranged in length from 3 to 30mm and in diameter from 5 microns to 30 microns. The thermally expanded mineral aggregate, viz. perlite, is added in the amount to constitute 70 percent of the final dry weight of the board to the remaining pulped newsprint-asphalt composition. The pulped newsprint-asphalt-perlite is then mixed in accordance with standard procedure for the preparation of insulation board. The composition, that is, the board furnish, is then placed on the board former and de-watered only sufficiently to remove the surface glaze. This fixes the wet mat in place and minimizes any erosion of the mat during the placing of the coating furnish or composition on its surface. The coating, including the glass fibers, is then applied to the wet mat substrate by flow-coating although any other suitable means is acceptable, the formed mat with the surface coating is then further de-watered under vacuum followed by pressing to a thickness of one inch and drying overnight at a temperature of 230°F. The resulting board in this example and the remaining examples was approximately one inch thick, with a density of from about 8 to about 10 pounds per cubic foot and a wet board solids level of 20 to 25 percent.

EXAMPLE 2

In this example, substantially the same procedure was followed as that utilized in Example 1. The percentage of the components and the appropriate data obtained as a result of tests is indicated in Table II.

TABLE II

| A | | B | |
|---|---|---|---|
| Board | Formula % | Coating Formula % | |
| Perlite | 70 | Pulped Newsprint | 61.0 |
| Newsprint (pulped) | 22.5 | Asphalt | 13.5 |
| Asphalt | 5.0 | Clay (Bentonite) | 7.0 |
| Clay (Bentonite) | 2.5 | Starch | 5.3 |
| | | Glass Fibers | 2.6 |
| | | Boric Acid | 5.3 |
| | | Borax | 5.3 |

Aside from the essential ingredients of the insulating materials of the present invention, other useful ingredients of the finished boards can also be included. For example, termite repellants, materials which prevent the formation of growth of algae, sizing materials in cases where the binder component of the boards does not impart sufficient resistance to water absorption, surface smoothing ingredients such as diatomaceous earth, etc., may be added as determined by the particular end usage of the board.

Additives of clay and starch used in the coating of the insulation board exhibit significant improvements in the strength both to the top surface and the bottom surface of the board indicating adequate migration of the starch through the board. The addition of the glass fibers to the coating also prevents or significantly retards the tendency of the boards to warp during the drying process as a result of excessive shrinkage in the board coating. The glass fibers not only reduced or eliminated the problems of warping, but also imparted additional strength to the coated surface board. To improve the fire resistant properties of the coated board due to the high percentage of organic materials in the board, additives such as boric acid, borax, ammonium sulfate and various phosphates may be included. The most favorable results, as indicated herein, are generally obtained with the combined mixture of boric acid and borax. Usage of fire retardant materials to effect better fire resistant properties is limited by the adverse effect of these water soluble additives on the water absorption properties of the board.

The modulus of rupture (MOR) for coated boards having a density of ten pounds per cubic foot, when broken in tension on the top surface, exhibited an average strength increase of 125 percent (83–188 pounds per square inch). For bottom surface breaks, the strength increases were not as great but were still quite significant averaging some 55 percent (that is, 85–131 pounds per square inch). Strength increases for coated boards at an 8 pound density range averages 134 percent (61–143 pounds per square inch) and 46 percent (61–89 pounds per square inch) for the top and bottom surface breaks respectively. Tests for internal bond strength also exhibited strength improvements of some 12 percent (10.1–13.1 pounds per square inch) and 17 percent (11.2–13.1 pounds per square inch) for the coated over the uncoated laboratory boards at densities of 8–10 pounds per cubic foot, respectively.

The test methods used were as follows: the modulus of rupture is as outlined in ASTM-C-203, except that 2 inch × 6 inch specimens were tested on a 4 inch span instead of 3 inch × 12 inch specimens on a 10 inch span; internal bond (tensile strength perpendicular to board surface) is as described in ASTM-C-209, except that 2 inch × 2 inch specimens were used instead of 12 inch × 12 inch; inclined panel flame test used is that outlined in ASTM-C-209, except for 6 inch × 6 inch specimens were used instead of 12 inch × 12 inch.

Any of the various available board forming machines may be employed for forming boards described herein on a commercial sacle, including the Fourdrinier machine, rotary vacuum filters or cylinder-type board machines, all of which operate continuously, and suction mold-type equipment.

The principles, preferred embodiments, and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit or scope of the present invention.

What is claimed is:

1. A thermal and acoustical insulating composition comprising a thermally expanded mineral aggregate, a defibrillated fibrous material, and a binder wherein said insulating composition is in the form of a structural insulating board and wherein a coating containing glass fibers, a binder, and defibrillated fibrous materials, is applied to at least one major surface of such structural insulating board.

2. The thermal and acoustical insulating composition of Claim 1 comprising a thermally expanded mineral aggregate, a defibrillated cellulosic fibrous material and a binder and wherein said coating comprises a defibrillated organic fibrous material, clay, a binder and glass fibers.

3. The thermal and acoustical insulating composition of Claim 2 wherein said binder is bituminous.

4. The thermal and acoustical insulating composition of Claim 2 wherein said defibrillated organic fibrous material is cellulosic.

5. A thermal and acoustical insulating composition comprising from about 50 to about 85 percent thermally expanded mineral aggregate, from about 10 to about 30 percent defibrillated cellulosic fibrous material, from about 1 to about 12 percent bituminous binder, wherein said composition is in the form of a structural insulating board having a coating thereon comprising from about 40 to about 80 percent defibrillated cellulosic fibrous material, from about 5 to about 20 percent bituminous binder, from about 2 to about 15 percent clay and from about 1 to about 8 percent glass fibers.

6. A composition of claim 6 wherein the defibrillated cellulosic fibrous material is selected from the group consisting of pulped newsprint, pulp, kraft paper pulp, and bagasse, the bituminous binder is asphalt, the clay is selected from the group consisting of kaolin or china clay, ball clay, fire clay, stoneware clay, bentonite, fuller's earth, activated clays, dusting clays, bleaching clays, calcined clays, colloidal clays, enamel clays and fuller clays, and the glass fibers are less than 1.5 inches long having a diameter not in excess of 50 microns.

7. A composition of claim 6 wherein the defibrillated cellulosic fibrous material is pulped newsprint, and the clay is bentonite.

8. A coated thermal and acoustical insulating board comprising a mineral aggregate selected from the group consisting of thermally expanded aluminosilicate rocks including perlite, and exfoliated vermiculite; a clay selected from the group consisting of kaolin, ball clay, fire clay, bentonite, activated clays, calcined clays, and fuller clays; and pulped newsprint wherein said insulating board has applied to at least one major surface thereof a coating comprising pulped newsprint, a bituminous binder, clay, starch and glass fibers.

9. A coated perlite or exfoliated vermiculite thermal and acoustical insulating board comprising, on a dry basis, from about 10 to 30 percent pulped newsprint, from about 01. to about 8 percent bentonite clay, from about 1.0 to about 12 percent asphalt, and from about 50 to about 85 percent of a material selected from the group consisting of exfoliated vermiculite and perlite, wherein the structural insulating board has applied to one major surface thereof a coating comprising from about 40 to about 80 percent pulped newsprint, from about 5 to about 20 percent asphalt, from about 2 to about 15 percent bentonite, from about 1 to about 15 percent starch, from about 1 to about 8 percent glass fibers, from about 1 to about 8 percent boric acid, and from about 1 to about 10 percent borax.

10. A coated perlite thermal and acoustical insulating board, comprising on a dry basis, 70 percent thermally expanded perlite, 22 percent pulped newsprint, 5 percent asphalt, and 3 percent Wyoming bentonite clay wherein said substrate has applied to at least one major surface thereof a coating comprising 62 percent pulped newsprint, 14 percent asphalt, 6 percent Wyoming bentonite, 5 percent starch, 3 percent glass fibers, 4 percent boric acid, and 6 percent borax.

11. A process for producing coated thermal and acoustical structural material comprising:
   a. mixing a thermal expanding aggregate, defibrillated cellulosic fibrous material, a binder and clay;
   b. Depositing a sufficient amount of said composition on a board-forming machine to form a mat of desired thickness and consistency;
   c. Partially dewatering said mat in amounts sufficient to remove the water glaze therefrom;
   d. Applying to the still wet surface of the deposited mass a coating comprising glass fibers, defibrillated cellulosic fibers, clay, and binder; and then
   e. Dewatering, pressing and drying said mass.

12. The process of claim 11 wherein the defibrillated cellulosic fibrous material is selected from the group consisting of pulped newsprint, pulp, kraft paper pulp, and bagasse; the thermally expandable alumino-silicate rocks including perlite and vermiculite, the bituminous binder is asphalt; the clay is selected from the group consisting of kaolin or china clay, ball clay, fire clay, bentonite, fuller's earth, activated clays, dusting clay, calcined clays, colloidal clays, and filler clays, and the glass fibers are less than 1 ½ inches long having a diameter not in excess of 30 microns.

13. The process of Claim 11 wherein the thermal acoustical insulating composition comprises from about 50 to about 85 percent thermally expanded mineral aggregate, from about 10 to about 30 percent defibrillated cellulosic fibrous material, from about 1 to about 12 percent bituminous binder, wherein said composition is in the form of a structural insulating board having a coating applied to at least one major surface thereof which comprises from about 40 to about 80 percent defibrillated cellulosic fibrous material, from about 5 to about 20 percent bituminous binder, from about 2 to about 15 percent clay and from about 1 to about 8 percent glass fibers.

14. The process of claim 11 wherein the thermal acoustical insulating composition comprises, on a dry basis, from about 50 to about 85 percent thermally expanded perlite, from about 10 to about 30 percent pulped newsprint, from about 1 to about 12 percent asphalt, from about 0.1 to about 8 percent bentonite clay, and wherein the coating applied to the major surface thereof comprises from about 40 to about 80 percent pulped newsprint, from about 5 to about 20 percent asphalt, from about 2 to about 15 percent bentonite, from about 1 to about 10 percent starch, from about 1 to about 8 percent glass fibers, from about 1 to about 8 percent boric acid and from about 1 to about 10 percent borax.

* * * * *

Notice of Adverse Decision in Interference

In Interference No. 99,545 involving Patent No. 3,779,860, O. A. Oshida and M. Shawgo, THERMAL AND ACOUSTICAL STRUCTURAL INSULATING COMPOSITION, final judgment adverse to the patentees was rendered July 17, 1978, as to claims 1, 2, 4 and 11.

[*Official Gazette October 17, 1978.*]